United States Patent [19]
Dougal

[11] Patent Number: 5,371,758
[45] Date of Patent: Dec. 6, 1994

[54] APPARATUS FOR EFFICIENT, MORE UNIFORM HIGH POWER EXCITATION OF A DYE MEDIA OPTICAL AMPLIFIER

[75] Inventor: Shawn M. Dougal, Livingston, N.J.

[73] Assignee: Exxon Research and Engineering Company, Florham Park, N.J.

[21] Appl. No.: 134,241

[22] Filed: Oct. 8, 1993

Related U.S. Application Data

[63] Continuation of Ser. No. 898,643, Jun. 15, 1992, abandoned.

[51] Int. Cl.$^5$ ................................................. H01S 3/08
[52] U.S. Cl. .................................. 372/99; 372/66; 372/70; 372/92; 372/100; 372/54
[58] Field of Search ........................ 372/99, 66, 69, 70, 372/92, 100, 54

[56] References Cited

U.S. PATENT DOCUMENTS 4,380,076  4/1983  Bethune ........................... 372/54

*Primary Examiner*—Léon Scott, Jr.
*Attorney, Agent, or Firm*—Ronald D. Hantman

[57] ABSTRACT

Apparatus for transversely irradiating a region equally from two directions using a single incident beam of substantially collimated radiation. The apparatus includes perpendicular reflective planes having a common edge and defining a corner region in which an irradiated region entirely within said corner region, said irradiated region being suitably positioned within said corner region such that said irradiated region does not intercept any ray of incident radiation from striking said common edge, said irradiated region receiving only radiation from two directions. Said irradiated region being directly irradiated from a first direction by incident radiation, and said irradiated region being also indirectly irradiated from a second direction opposite said first direction by incident radiation reflected from both of said planes.

14 Claims, 4 Drawing Sheets

APPARATUS FOR EFFICIENT, MORE UNIFORM HIGH POWER EXCITATION OF A DYE MEDIA OPTICAL AMPLIFIER

This is a continuation of application Ser. No. 07/898,643 filed Jun. 15, 1992 and now abandoned.

BACKGROUND OF THE INVENTION

The present invention relates to pulse dye lasers. The present invention utilizes a right angle prism to direct radiation from a pump laser onto an optically amplifying medium from two directions, improving the uniformity and maintaining a high efficiency of excitation compared with other means.

A major problem in laser pumped pulse dye lasers has been that of uniform pumping of the dye medium without damage to the system. The most frequently used method for high energy pumping is that of side pumping a dye cell. A positive cylindrical lens is used to focus the pump beam tightly into the dye cell. While this is an efficient means of exciting the active, dye medium, it results in a conical shaped region of excitation that degrades the basic spatial mode of the dye laser.

A four sided pumping scheme that attempts to produce a more uniform excitation was developed by D. Bethune U.S. Pat. No. 4,380,076. The cell for four sided pumping consists of a right angle prism with a bore cylinder through which laser dye flows through the prism body. The pump beam is made four times that of the bore diameter and approximately collimated in the plane orthogonal to the bore cylinder. One quarter of the incident beam pumps the dye in the bore directly without reflection, while the remainder of the beam utilizes one or two total internal reflections to pump the dye from the three remaining directions. Although this process excites the dye medium more uniformly than in the cylindrical lens method, it is not efficient when the pulsed dye laser is linearly polarized and of short pulse duration. In such a four sided pumping scheme, where the direction of polarization of the pump beam is orthogonal to the bore axis, the portions of the pump beam that have experienced an odd number of reflections in the prism are polarized in directions orthogonal to the other beams at the bore cylinder. Consequently, both sets of beams cannot excite the dye molecules uniformly in a single polarization state, matching the polarization of the linearly polarized light that is being amplified. In short pulse systems, the molecules do not have time to reorient in the solvent so a linearly polarized dye beam cannot be amplified efficiently by molecules pumped by radiation in an orthogonal polarization. In the case where the pump radiation is polarized parallel to the bore axis, the number of reflections have no effect on the polarization direction. Unfortunately, dye molecules that have been excited with this polarization and retain their orientation cannot contribute to amplification of the dye laser, regardless of the dye laser polarization, since longitudinally polarized light cannot propagate. Only if the dye laser pulse were to last for a period of time greater than the rotational correlation time of the dye molecules and the fluorescence lifetime of the dye exceed the rotation correlation time could these pumped molecules reorient significantly to contribute to the amplification process. The most efficient optical pumping is achieved when the polarization of the pump beam and the polarization of the dye laser beams are parallel. It should be noted that most pulsed dye lasers utilize a diffraction grating or prisms for frequency tuning and thus inherently produce a linearly polarized laser beam.

Measurements have shown that a pulsed dye amplifier using DCM dye with methanol/propylene carbonate as the solvent, pumped by a 532 nm laser beam with a pulse duration of approximately 10 nanoseconds and polarized orthogonal to the dye laser polarization, was only 20% as efficient as when the polarization of the pump beam and the dye laser were matched. In addition, the orthogonal polarization directions of the pump and dye laser beams gave rise to significant amplified spontaneous emission (ASE) in the orthogonal polarization producing elliptical polarization in the dye laser beam. In addition, an accelerated degradation of the dye also occurs for a given output energy. Since the useful lifetime of many ultraviolet dyes is only a few hours of lasing, this latter consideration is important as a cost factor and as a toxic waste disposal factor.

SUMMARY OF THE INVENTION

In an optically pumped laser, a corner reflector for transversely irradiating a region equally from two directions using a single incident beam of substantially collimated transversely polarized radiation. In a preferred embodiment, the apparatus includes a prism having right reflective planes. The prism includes a cylindrical irradiated region containing a dye suitably positioned within the prism such that it is directly irradiated from a first direction by incident radiation, and it is indirectly irradiated from a second direction opposite the first direction by incident radiation reflected from both of the planes whose polarization is the same as the radiation from the first direction.

DESCRIPTION OF INVENTION

The present invention is designed for pulsed dye laser optical pumping. This configuration avoids the polarization problems inherent in four sided pumping. It allows uniform excitation by irradiating from only two directions that share a common axis and common polarization. In the preferred embodiment, the polarization of the dye laser radiation and pump radiation should be parallel. It utilizes a right angle prism with a cylindrical bore for the flowing laser dye. The term "cylinder" is used here in to mean a shape having an axis, but irregular shaped bases. The bases may be circular, square or some convenient shape. For definition of cylindrical see Dictionary of Mathematics, edited by Carol Gibson, Facts on File, Inc. (1981). The bore cylinder circle is tangent to a line bisecting the right angle of the prism. The pump beam is linearly polarized orthogonal to the bore axis. The beam diameter in the direction normal to the bore is twice the bore diameter after refraction at the air-prism interface. In the direction parallel to the bore, the pump beam will be generally expanded to fill the length of the bore in order to obtain uniform pumping of the dye. The pump beam propagates parallel to the plane normal to the bore axis and is substantially collimated in that plane, but is free to diverge or converge somewhat in the direction of the bore axis. The beam is incident on the prism surface and refracted so that it is bisected by the plane which bisects the apex of the right angle. Half of this pump beam intercepts the bore cylinder directly. The remaining portion of the beam is internally reflected twice and intercepts the dye cylinder from the opposite direction. This preserves a common polarization in both halves of the pump beam. Since the direction of polarization of the pump beam is the same as the light to be amplified, efficiency is greatly improved and ASE is lower when compared with the four sided configuration.

The bore circle can be tangent at any point along the line bisecting the right angle provided the distance between the apex and the tangent point is equal to or greater than 1.5 times the bore circle diameter. It should be noted that as this distance increases the possibility of undesirable inadvertent single reflected beams, which are detrimental to the desired results, is reduced. The difference in optical path between the two halves of the pump beam should be such that the time difference in excitation of the dye medium by the two paths is a small fraction (20%) of the rotation correlation time of the excited dye.

Figure 1:
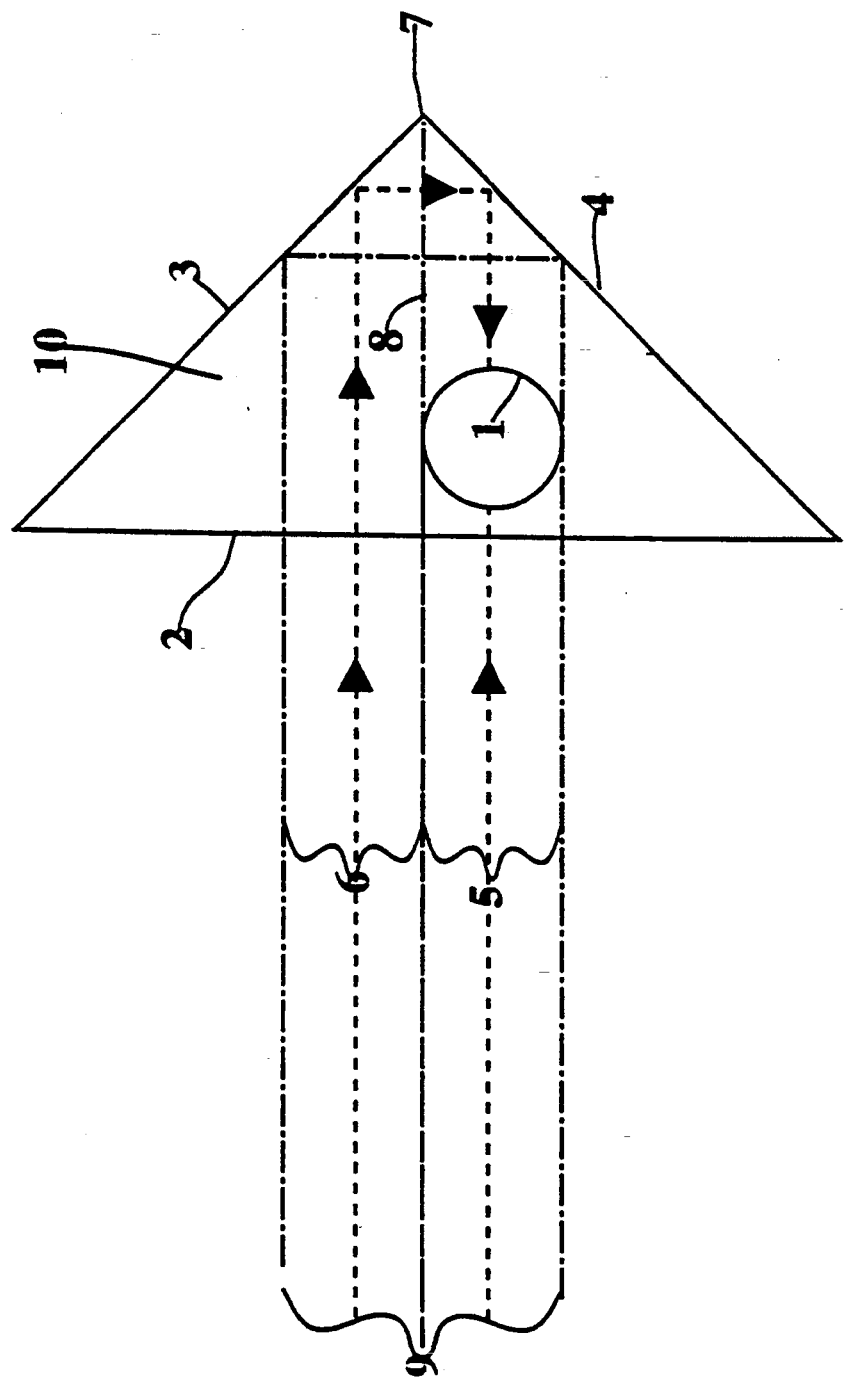
FIG. 1 shows a cross-sectional view of the prism dye flow cell.

Referring to FIG. 1, we see the cross-section of the instant invention consisting of an isosceles right angle prism cell 10 for directing radiation onto a bore cylinder circle 1 from two directions sharing a common axis parallel to the bisecting plane 8 of the right angle apex 7 by halves 5 and 6 of a single laser pump beam 9. The bore cylinder 1 is oriented normal to the plane of the triangle defined by side 2, side 3 and side 4. The bore cylinder circle 1 is made tangent to the bisecting plane 8. The point of tangent should be equal to or greater than 1.5× the bore cylinder 1 diameter from the right angle apex.

The pump beam 9 should be substantially collimated in a direction normal to the bore cylinder 1 axis and should be substantially linearly polarized in the orthogonal direction to bore cylinder 1 axis. The polarization of dye laser beam should be substantially linearly polarized made substantially parallel to the polarization of pump beam. The collimated diameter of the pump beam 9 should be twice the diameter of the bore cylinder 1 circle, it can be somewhat divergent or convergent in the direction parallel to the bore cylinder axis. The pump beam 9 is incident on the hypotenuse face 2 and centered on the bisecting plane 8 and propagates substantially parallel to this plane 8. Portion 5 of the pump beam 9 intercepts the cylindrical region directly. Portion 6 of the pump beam 9 is first totally internally reflected by prism surfaces 3. Portion 6 is then totally internally reflected by prism surface 4 and irradiates the bore cylinder circle 1 on the same axis as portion 5 of beam 9.

The prism body 10 can be manufactured from any suitable material that will support total internal reflection at an internal angle of incidence that is less than 45 degrees, is substantially transparent to the pump radiation and will not chemically interact with the dye solution. If the refractive index of the material of the prism body 10 will not support total internal reflection a reflective coating can be applied to effect reflection on surfaces 3 and 4. The hypotenuse face 10 of the prism may have an anti reflection coating to reduce pump beam 9 radiation losses at this interface.

Figure 2:
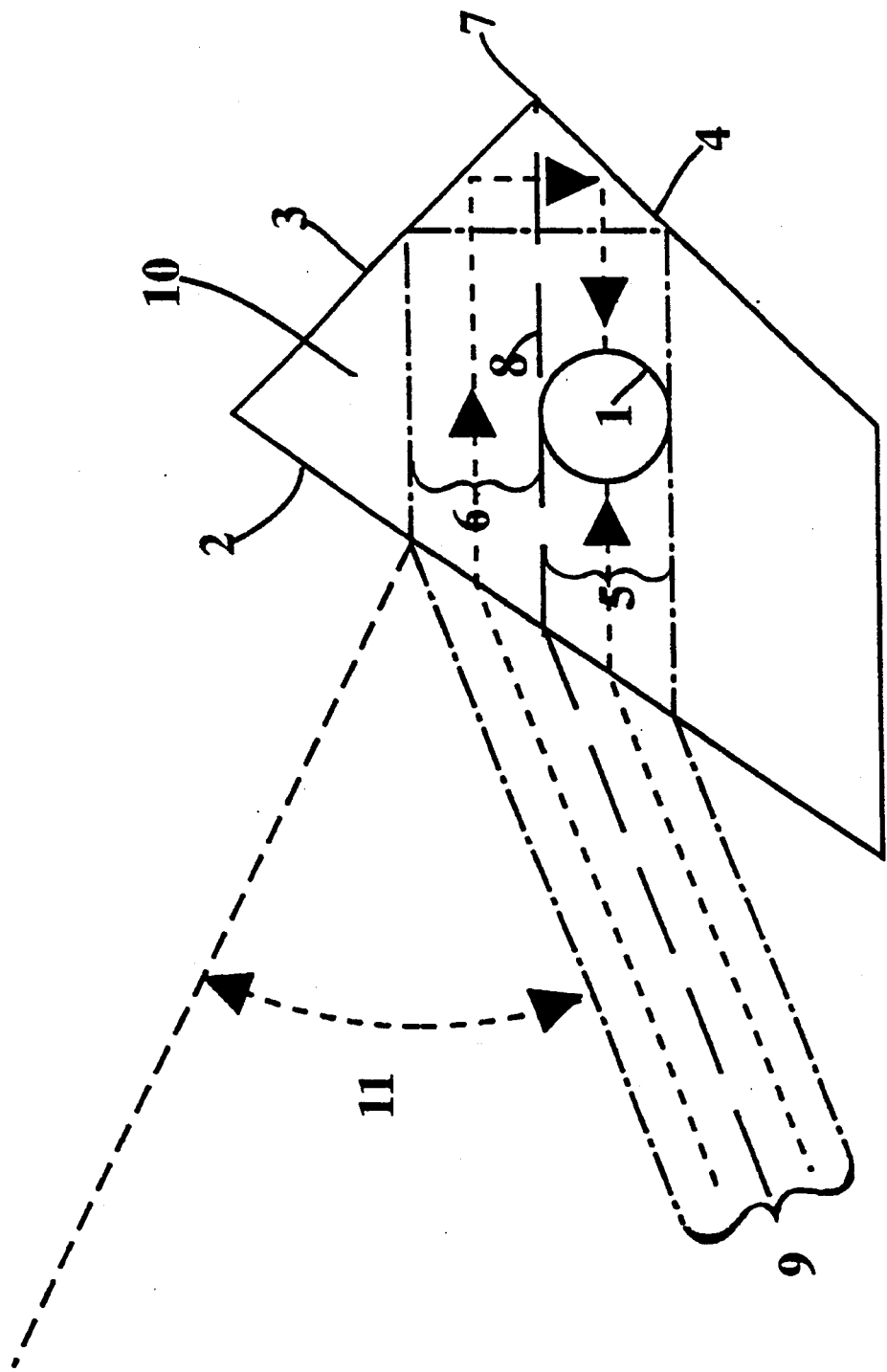
FIG. 2 shows a cross-sectional view of a prism dye cell designed for Brewster angle incidence of the pump beam.

FIG. 2 shows a cross-section of another embodiment which minimizes the reflective losses to the pump beam 9 at the prism interface without anti reflection coatings. The pump beam 9 is polarized parallel to the plane of incidence and incident on surface 2 at Brewster's angle 11. The prism face 2 should have the appropriate angular relationship to the right angle corner 7 so that the incident pump beam 9 is refracted parallel to the bisecting plane 8 of the right angle corner 7. This is determined by the refractive index of the prism material at the wavelength of the pump beam. The propagation and the beam size characteristics of the pump beam 9 within the prism is subject to the same considerations as described for FIG. 1. In this embodiment it should be noted that since the pump beam 9 is refracted at non-normal incidence at the prism interface 2, the pump beam 9 is expanded within the prism in the plane of incidence by an amount equal to the relative index of refraction. This expansion should be taken into account for appropriate matching of the beam size to the bore circle 1.

Figure 3:
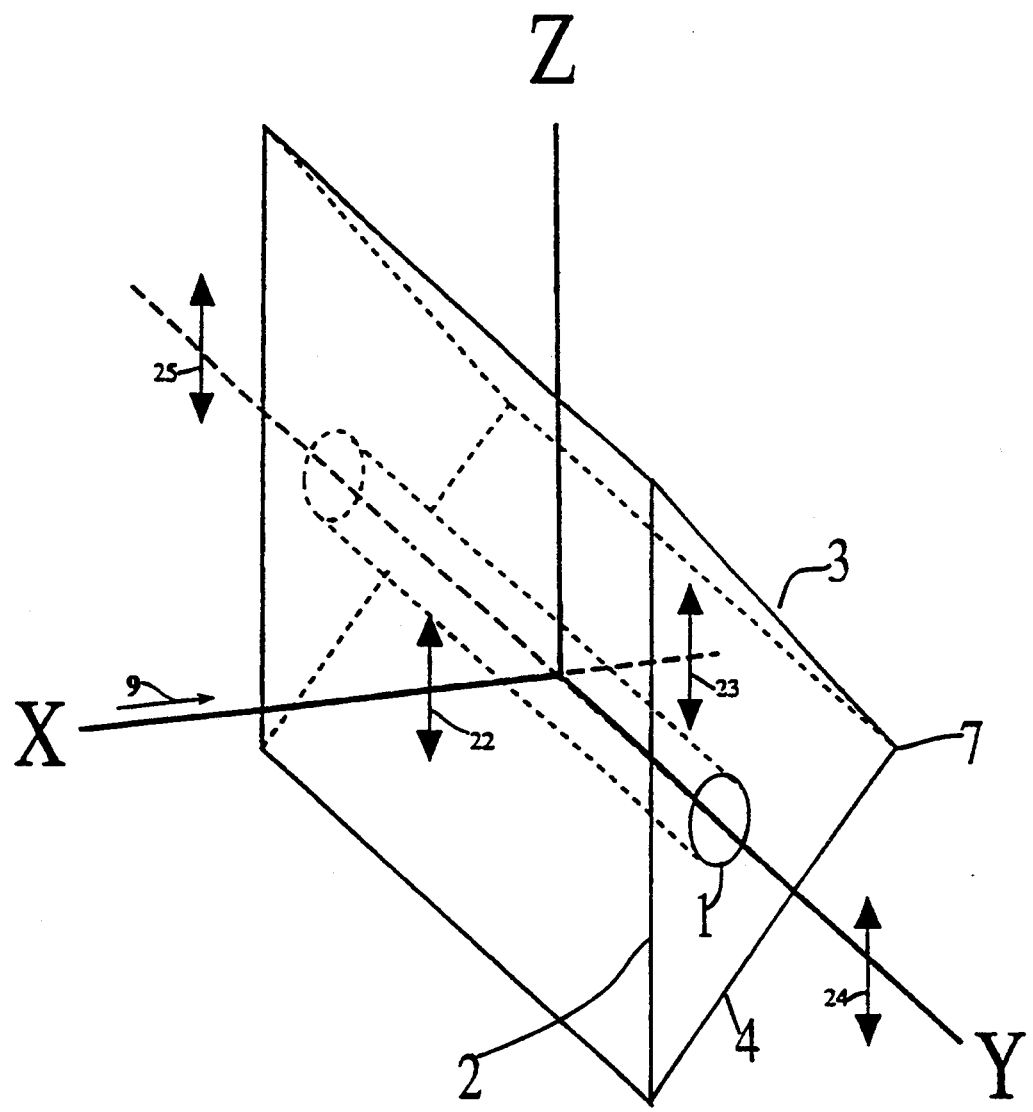
FIG. 3 shows the prism dye cell described in FIG. 1 with orthogonal coordinate axis to show the preferred polarization direction.

FIG. 3 shows the prism cell described in FIG. 1 and orthogonal coordinate axis X,Y,& Z. A linearly polarized pump beam 9 propagates substantially along the X axis and the linearly polarized dye laser beam propagates substantially along the Y axis. The Y axis is parallel to the bore cylinder axis and the Z axis is parallel to the hypotenuse 2. The double arrows 22,23,24,25 represent the directions of the polarization for the respective beams. It is important for maximum efficiency that direction of polarization of the pump beam and the direction of polarization of the dye laser beam be parallel to each other as shown in FIG. 3. Maximum efficiency in the present invention occurs when the pump beam 9 is linearly polarized and is incident at the bore cylinder with the direction of polarization parallel to the Z axis and dye laser beam is also linearly polarized in the direction parallel to the Z axis. Little amplification will be realized in short pulse laser systems if the pump beam 9 is linearly polarized in the direction parallel to the bore cylinder 1 axis.

In an additional embodiment of the invention, the pump beam 9 may be comprised of what is commonly referred to as unpolarized or randomly polarized light, as is often the case in commercial excimer lasers. For this case, the component of the pump beam 9 which is polarized in the direction orthogonal to the bore cylinder 1 axis will contribute on a short time scale to the amplification of the dye beam. The component parallel to the bore axis 1, however, does not substantially contribute to the amplification process. In this embodiment, although their is significant waste of the pump energy, the invention nevertheless represents an improvement in efficiency over four sided pumping for pulsed operation.

Figure 4:
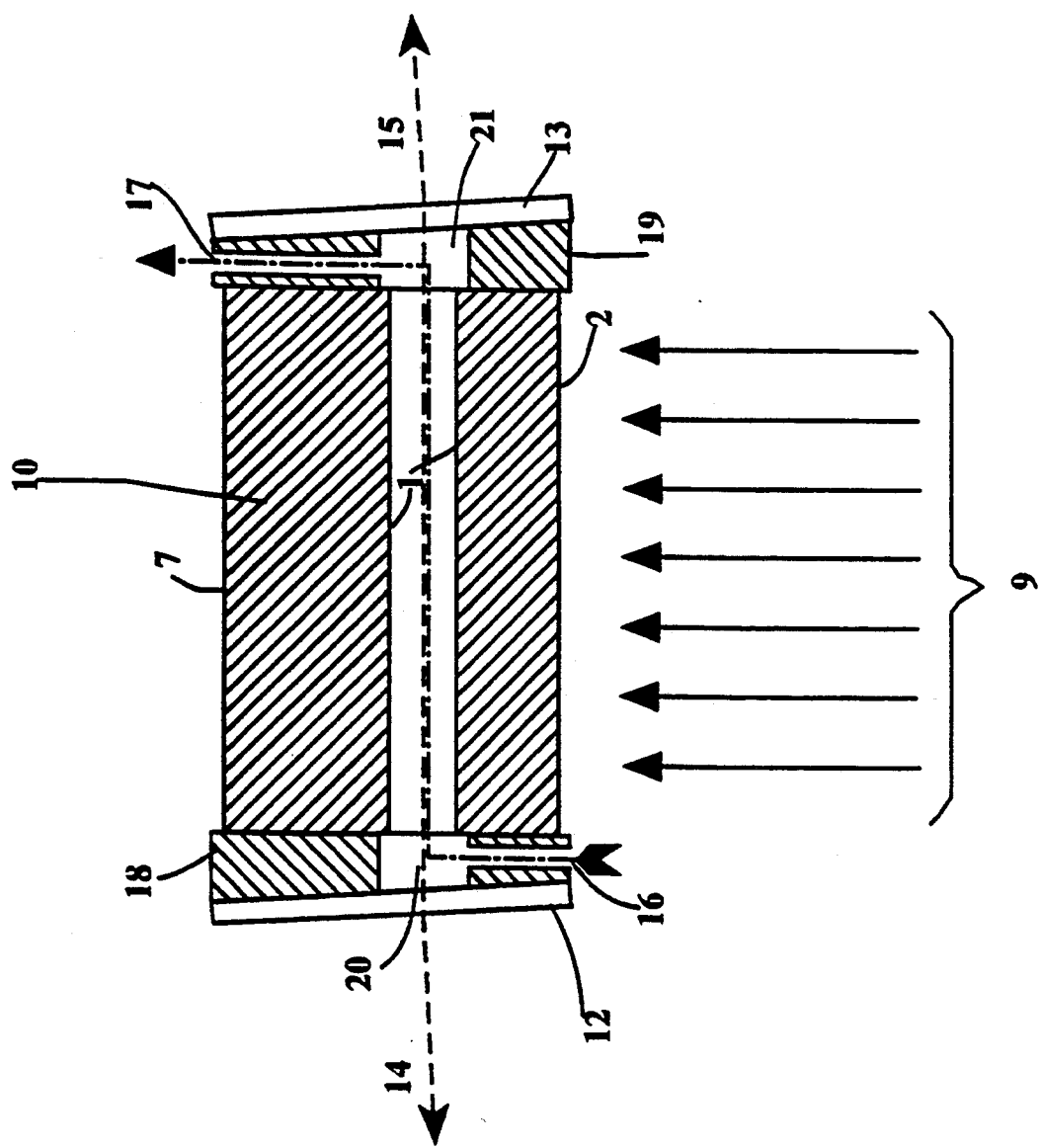
FIG. 4 shows a cross-section of a flowing dye laser cell assembly.

FIG. 4 illustrates a laser dye cell assembly incorporating the prism structure 10 in FIG. 1. End blocks 18,19 have passageways 20,21 respectively to allow both the amplified radiation to exit and the dye laser solution to flow. The end blocks 18,19 and passageways 20,21 are aligned with the cylinder bore 1 of the prism body 10 and sealed to the prism body 10 by epoxy or other means known in the art. Windows 12,13 are sealed to the end blocks 18,19 with epoxy or with rubber o-ring or other means known in the art. Liquid dye entering port 16 flows though passageways 20,1,21 and exits port 17. The pump beam 9 is incident on the prism surface 2 and irradiates region 1. The amplified radiation exits thought windows 12 and 13.

An additional embodiment of the present invention makes use the of reflective surfaces of a right angle corner reflector in place of the reflective surfaces 3,4 of the prism 10. In this embodiment the position of the active medium has the same relationship to the reflective surfaces of the corner reflector as the bore cylinder 1 has to the reflective surfaces 3,4 of the prism 10 as described for FIG. 1. The optically active medium could be a solid as well as a dye in an appropriate cylinder housing.

Any suitable laser dye such as DCM dissolved in propylene carbonate and methanol, can be used for the amplifying medium in region 1. A frequency doubled laser beam from a Q-switched Nd:YAG laser is a suitable linearly polarized radiation source for the pump beam 9. A solid optically active medium could be used in the place of a laser dye in the bore cylinder. Polarization dependence should be considered for proper orientation of the solid medium. In the case of solid medium index matching fluid could be added between the prism body and the medium to limit reflective loss and bending of the beam at the interface.

An additional advantage of the instant invention is that the fabrication is simpler because the positioning of the bore circle is relaxed compared to the four sided pumping scheme commonly employed. In the common four sided pumping scheme designed so the beams are reflected by 90 degrees the minimum distance from the bore circle to the edge of the prism being approximately 0.414r, where r is the radius of the bore cylinder. This makes manufacturing difficult when a small bore diameter is needed because it results in a thin wall between the bore cylinder and the prism edge. This limitation is removed as the bore cylinder is moved further from the right angle corner which is allowable and preferred in the present invention but is not allowed in this four sided pumping scheme.

What is claimed is:

1. In an optically pumped pulsed laser system, a right angle corner reflector comprising a region having an active medium that is irradiated substantially equally from only two opposing directions along a straight line to pump the active medium most efficiently with a beam whose polarization is substantially matched to the polarization of the laser beam to be amplified, using a single incident pulsed pump beam of substantially collimated radiation wherein the polarization of the amplified laser beam is substantially linear and orthogonal to the plane formed by the direction of propagation of the pumped pulsed beam and the amplified beam, and wherein said corner reflector includes:

(a) two reflective planes at right angles; and
   (b) an irradiated region including said active medium entirely within said corner reflector, said irradiated region being substantially cylindrical, positioned within said corner reflector so as to be directly irradiated from a first direction by incident radiation, and said irradiated region being also indirectly irradiated from a second direction opposite said first direction by incident radiation reflected from both of said planes.

2. The apparatus of claim 1 wherein said incident pump beam is substantially polarized orthogonal to the axis of the said cylindrical region.

3. The apparatus as defined in claim 2 wherein said incident beam is a laser beam.

4. The apparatus of claim 1 wherein said right angle corner reflector includes a right angle prism.

5. The apparatus as defined in claim 4 wherein said prism includes a cavity containing the active medium.

6. The apparatus as defined in claim 4 wherein said perpendicular reflective planes are surfaces of a prism.

7. The apparatus as in claim 4 where said prism faces are arranged at Brewsters angle for said incident radiation.

8. The apparatus in claim 1 wherein said right angle corner reflector includes two reflective surfaces and said irradiated region includes a solid material.

9. The apparatus as defined in claim 1 wherein said irradiated region is cylindrical with a circular cross-section.

10. The apparatus as defined in claim 9 wherein said cylindrical region which is irradiated is defined by a longitudinally oriented hole through said prism.

11. The apparatus as defined in claim 10 wherein said longitudinally oriented hole through said prism is filled with laser dye solution, said apparatus forming part of a dye laser resonator.

12. The apparatus as defined in claim 10 wherein said longitudinally oriented hole through said prism is filled with laser dye solution, said apparatus forming a dye laser amplifier.

13. The apparatus as defined in claim 10 wherein said longitudinally oriented hole through said prism is filled with a solid active medium, said apparatus forming part of a laser resonator.

14. The apparatus as defined in claim 10 wherein said longitudinally oriented hole through said prism is filled with a solid active medium, said apparatus forming part of a laser amplifier.

* * * * *